United States Patent
Aoyagi et al.

(10) Patent No.: US 11,683,675 B2
(45) Date of Patent: Jun. 20, 2023

(54) USER EQUIPMENT, BASE STATION APPARATUS, AND CORE NETWORK APPARATUS

(71) Applicant: NTT DOCOMO, INC., Tokyo (JP)

(72) Inventors: Kenichiro Aoyagi, Tokyo (JP); Atsushi Minokuchi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 67 days.

(21) Appl. No.: 17/054,663

(22) PCT Filed: May 23, 2019

(86) PCT No.: PCT/JP2019/020527
§ 371 (c)(1),
(2) Date: Nov. 11, 2020

(87) PCT Pub. No.: WO2019/225711
PCT Pub. Date: Nov. 28, 2019

(65) Prior Publication Data
US 2021/0120396 A1 Apr. 22, 2021

(30) Foreign Application Priority Data
May 25, 2018 (JP) .............................. JP2018-101054

(51) Int. Cl.
*H04W 8/06* (2009.01)
*H04W 36/00* (2009.01)
(Continued)

(52) U.S. Cl.
CPC ......... *H04W 8/06* (2013.01); *H04W 36/0022* (2013.01); *H04W 48/02* (2013.01); *H04W 48/10* (2013.01); *H04W 88/06* (2013.01)

(58) Field of Classification Search
CPC . H04W 36/0022; H04W 48/02; H04W 48/10; H04W 48/16; H04W 48/18;
(Continued)

(56) References Cited

U.S. PATENT DOCUMENTS

| 11,115,915 B2* | 9/2021 | Lou ........................ H04W 48/18 |
| 2015/0109918 A1* | 4/2015 | Sharma ............. H04W 36/0055 370/230 |

(Continued)

FOREIGN PATENT DOCUMENTS

| EP | 3528550 A1 | 8/2019 |
| WO | 2018/082673 A1 | 5/2018 |

OTHER PUBLICATIONS

3GPP TS 38.401 V15.1.0 "3rd Generation Partnership Project; Technical Specification Group Radio Access Network; NG-RAN; Architecture description (Release 15)" Mar. 2018 (23 pages).
(Continued)

*Primary Examiner* — William Nealon
(74) *Attorney, Agent, or Firm* — Osha Bergman Watanabe & Burton LLP

(57) ABSTRACT

User equipment is capable of connecting to a first core network and a second core network through a base station apparatus. The user equipment includes a controller that connects to, upon selecting or visiting a cell of a base station apparatus that does not support the first core network while connecting to the first core network or visiting the first core network, the second core network through a connection in the cell.

3 Claims, 10 Drawing Sheets

(51) Int. Cl.
*H04W 48/02* (2009.01)
*H04W 48/10* (2009.01)
*H04W 88/06* (2009.01)

(58) Field of Classification Search
CPC ....... H04W 76/12; H04W 76/16; H04W 8/06; H04W 88/06
See application file for complete search history.

(56) References Cited

U.S. PATENT DOCUMENTS

| | | | |
|---|---|---|---|
| 2018/0249317 A1* | 8/2018 | Kurasugi | H04W 76/10 |
| 2019/0110243 A1* | 4/2019 | Chun | H04W 48/16 |
| 2019/0261264 A1* | 8/2019 | Lou | H04W 48/18 |

OTHER PUBLICATIONS

3GPP TSG-RAN WG2 #99; R2-1707839 "Inter-system and inter-RAT mobility for LTE connected to 5GC" Ericsson; Berlin, Germany; Aug. 21-25, 2017 (6 pages).
3GPP TSG-RAN WG2 Meeting #99bis; R2-1710421 "Consideration on mobility for E-UTRA connected to 5GC" ZTE Corporation, Sane Chips; Prague, Czech; Oct. 9-13, 2017 (4 pages).
3GPP TSG-RAN WG2 Meeting #101 bis; R2-1806439 "Summary of Offline discussion #08 on coding of PLMNs list" CATT; Sanya, China; Apr. 16-20, 2018 (29 pages).
International Search Report issued in International Application No. PCT/JP2019/020527, dated Jul. 2, 2019 (5 pages).
Written Opinion issued in International Application No. PCT/JP2019/020527; dated Jul. 2, 2019 (5 pages).
Extended European Search Report issued in counterpart European Patent Application No. 19807749.7, dated Jan. 21, 2022 (7 pages).

* cited by examiner

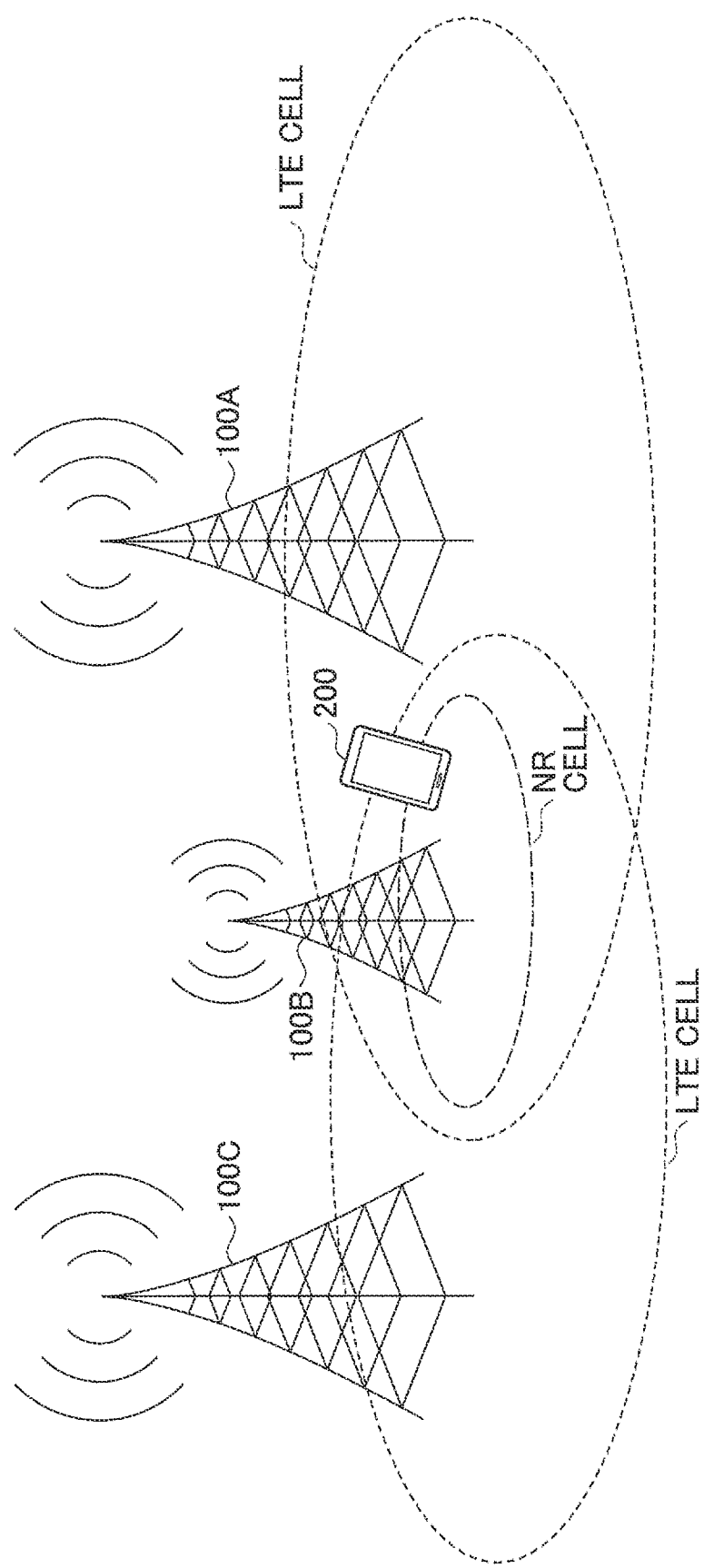

USER EQUIPMENT, BASE STATION APPARATUS, AND CORE NETWORK APPARATUS

TECHNICAL FIELD

The present invention relates to user equipment, a base station apparatus, and a core network apparatus of a radio communication system.

BACKGROUND ART

In 3GPP (3rd Generation Partnership Project), a radio communication scheme called 5G or NR (New Radio) (which is referred to as "5G" or "NR," hereinafter) has been studied, in order to further increase the capacity of the system, further increase a data transfer rate, and further reduce latency in a radio section. As for 5G, in order to meet a requirement that latency in a radio section is reduced to be less than or equal to 1 ms, while achieving a throughput of greater than or equal to 10 Gbps, various radio technologies have been studied.

For NR, a network architecture has been studied that includes a 5GC (5G Core Network) corresponding to an EPC (Evolved Packet Core), which is a core network of an LTE (Long Term Evolution) network architecture; and NG-RAN (Next Generation-Radio Access Network) corresponding to an E-UTRAN (Evolved Universal Terrestrial Radio Access Network) of the LTE network architecture (e.g., Non-Patent Document 1).

PRIOR ART DOCUMENT

Non-Patent Document

Non-Patent Document 1: 3GPP TS 38.401 V15.1.0 (2018-03)

SUMMARY OF THE INVENTION

Problem to be Solved by the Invention

When user equipment moves from a base station apparatus for shared operation between 5GC and EPC to a base station apparatus that does not support 5GC, a process related to Attach or location registration is unable to be executed in some cases.

The present invention has been accomplished in view of the above-described point, and an object is to ensure that user equipment properly completes location registration to connect to a core network.

Means for Solving the Problem

According to the disclosed technology, there is provided user equipment capable of connecting to a first core network and a second core network through a base station apparatus, wherein the user equipment includes a controller that connects to, upon selecting or visiting a cell of a base station apparatus that does not support the first core network while connecting to the first core network or visiting the first core network, the second core network through a connection in the cell.

Advantage of the Invention

According to the disclosed technology, user equipment can properly complete location registration to connect to a core network.

BRIEF DESCRIPTION OF DRAWINGS

FIG. 6 is a diagram illustrating an example of a configuration of a radio communication system according to an embodiment of the present invention;

EMBODIMENTS OF THE INVENTION

Figure 1:
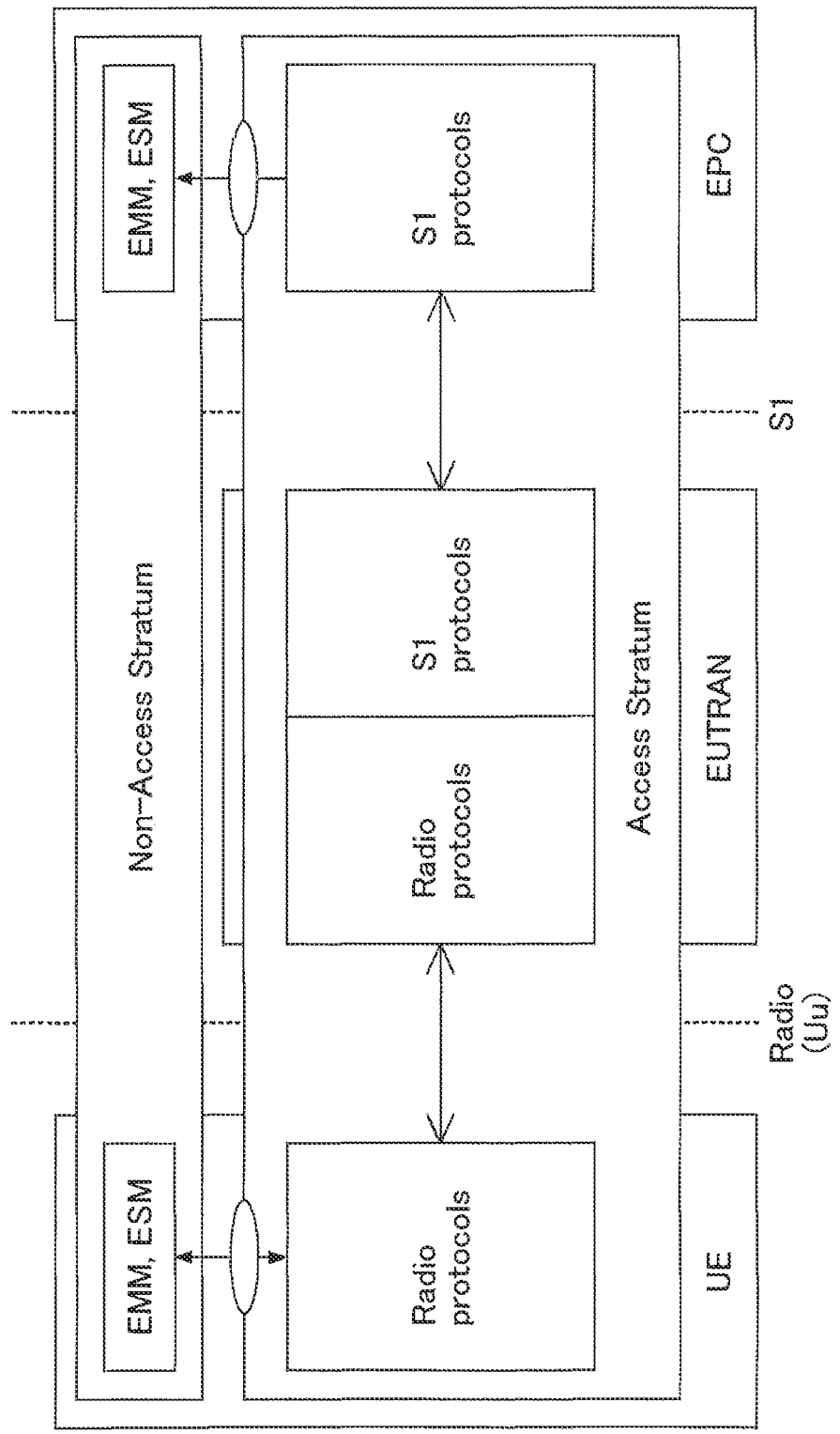
FIG. 1 is a diagram illustrating an example (1) of a network architecture according to an embodiment of the present invention.

In the following, embodiments of the present invention are described with reference to the drawings. Note that the embodiments described below are examples, and embodiments to which the present invention is applied are not limited to the following embodiments.

In an operation of a radio communication system according to an embodiment of the present invention, existing technology is appropriately used. The existing technology may be, for example, an existing LTE. However, the existing technology is not limited to the existing LTE. Furthermore, the term "LTE" as used in this specification, unless as otherwise stated, is expected to have a broad meaning including LTE-Advanced and a scheme subsequent to LTE-Advance (e.g., NR or 5G).

Additionally, in the embodiments of the present invention described below, terms are used, such as SS (Synchronization Signal), PSS (Primary SS), SSS (Secondary SS), PBCH (Physical Broadcast channel), PRACH (Physical RACH), DL (Downlink), and UL (Uplink), which are used in the existing LTE. These are for convenience of the description, and signals, functions, etc., which are similar to these, may be called by different names.

In an embodiment of the present invention, a duplex scheme may be a TDD (Time Division Duplex) scheme, an FDD (Frequency Division Duplex) scheme, or any other scheme (e.g., Flexible Duplex, etc.).

Furthermore, in the following description, transmitting a signal using a transmit beam may be transmitting a signal multiplied by a precoding vector (precoded by a precoding vector). Similarly, receiving a signal using a reception beam may be multiplying a received signal by a predetermined weight vector. Furthermore, transmitting a signal using a transmit beam may be transmitting a signal through a particular antenna port. Similarly, receiving a signal using a reception beam may be receiving a signal through a particular antenna port. An antenna port is a logical antenna port or a physical antenna port specified in the 3GPP standard.

The method of forming the transmit beam and the reception beams is not limited to the above-described method. For example, in the base station apparatus 100 or the user equipment 200 provided with a plurality of antennas, a method of varying angles of the respective antennas may be used; a method in which a method of using a precoding vector and the method of varying the angles are combined may be used; different antenna panels may be switched to be used; a method in which methods of combining a plurality of antenna panels are combined may be used; or another method may be used. Furthermore, for example, a plurality of mutually different transmit beams may be used in a high frequency range. The use of multiple transmit beams is called a multi-beam operation, and the use of a single transmit beam is called a single beam operation.

Furthermore, in an embodiment of the present invention, "configuring" a radio parameter, etc., may be that a predetermined value is preconfigured or specified; or that a radio parameter signaled from the base station apparatus 100 or the user equipment 200 is configured.

FIG. 1 is a diagram illustrating an example (1) of a network architecture according to an embodiment of the present invention. FIG. 1 shows a C-pane (Control plane) configuration in the network architecture of an LTE. As illustrated in FIG. 1, in an access layer (Access Stratum, AS), UE, which is the user equipment 200, and E-UTRAN are connected using a radio protocol via a radio interface (Uu: Radio interface between UTRAN and User Equipment). In the access layer, E-UTRAN and EPC are connected using an S1 protocol via an S1 interface. The S1 interface is a logical interface between an eNB (evolved NodeB), which is the base station apparatus 100 included in E-UTRAN, and EPC. The S1 interface provides an interconnection point between the E-UTRAN and the EPC and is a reference point.

As illustrated in FIG. 1, in a non-access layer (Non-Access Stratum, NAS), the UE and the EPC are logically connected. For example, a NAS control protocol between the UE and the EPC includes EMM (EPS Mobility Management) and ESM (EPS Session Management). The EPS is an Evolved Packet System. The EPC is formed of one or more core network apparatuses, and the one or more core network apparatuses can communicate with the base station apparatus 100 or the user equipment 200.

Figure 2:
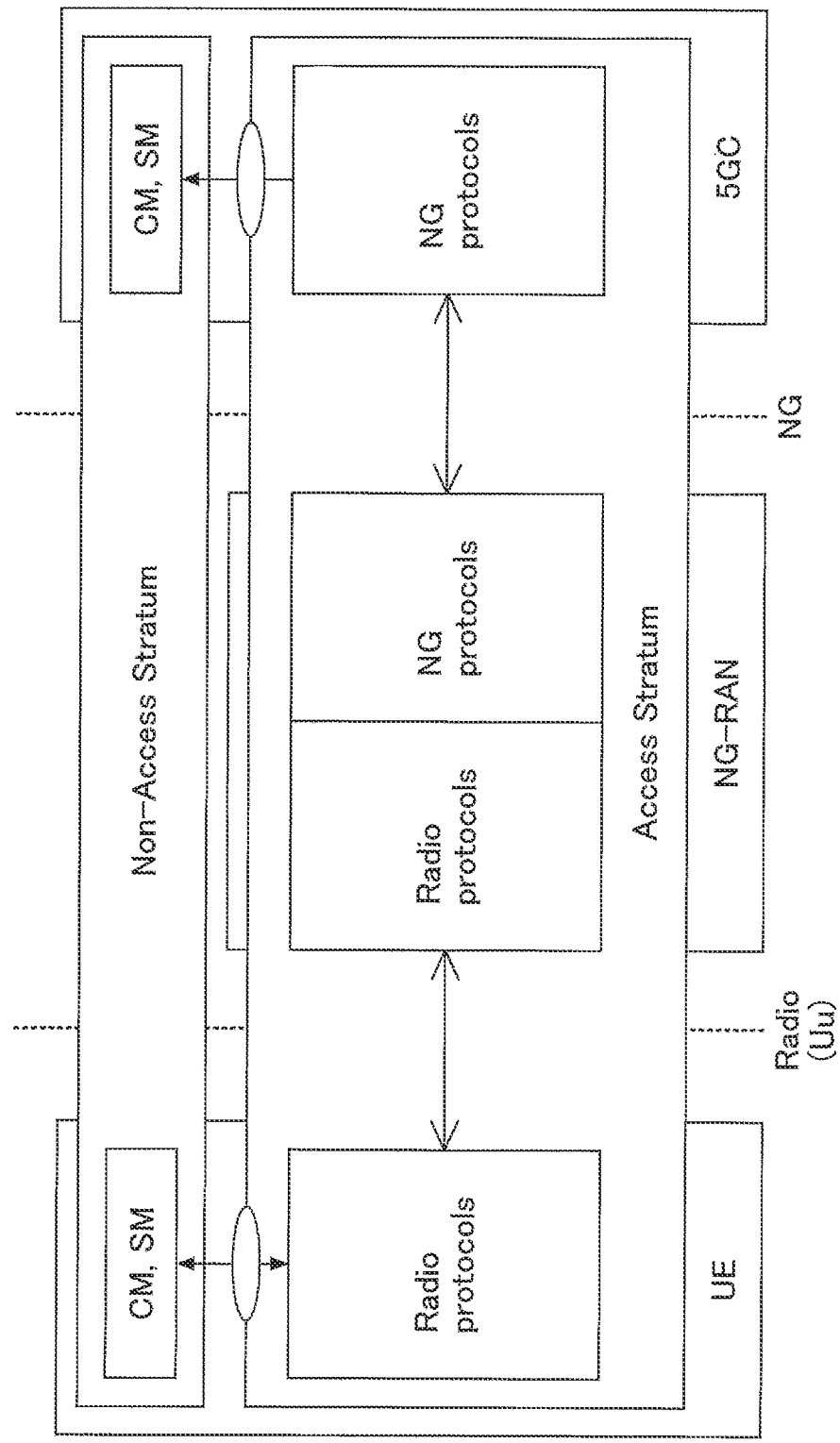
FIG. 2 is a diagram illustrating an example (2) of a network architecture according to an embodiment of the present invention.

FIG. 2 is a diagram illustrating an example (2) of a network architecture according to an embodiment of the present invention. FIG. 2 illustrates a C-plane configuration in the NR network architecture. As illustrated in FIG. 2, in an access layer, UE, which is the user equipment 200, and NG-RAN are connected using a radio protocol via a radio interface (Uu). In the access layer, NG-RAN and 5GC are connected using an NG protocol via an NG interface. The NG interface is a logical interface between a gNB (next generation node B), which is the base station apparatus 100 included in NG-RAN, and 5GC. The NG interface provides an interconnection point between the NG-RAN and the 5GC and is a reference point.

As illustrated in FIG. 2, in the non-access layer (NAS), the UE and the 5GC are logically connected. For example, a NAS control protocol between the UE and the 5GC includes CM (connection management) and SM (session management). The 5GC is formed of one or more core network apparatuses, and the one or more core network apparatuses can communicate with the base station apparatus 100 or the user equipment 200.

Figure 3A:
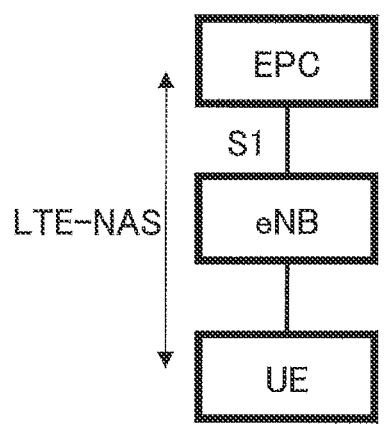
FIG. 3A is a diagram illustrating an example (1) of a C-plane connection mode according to an embodiment of the present invention.
Figure 3B:
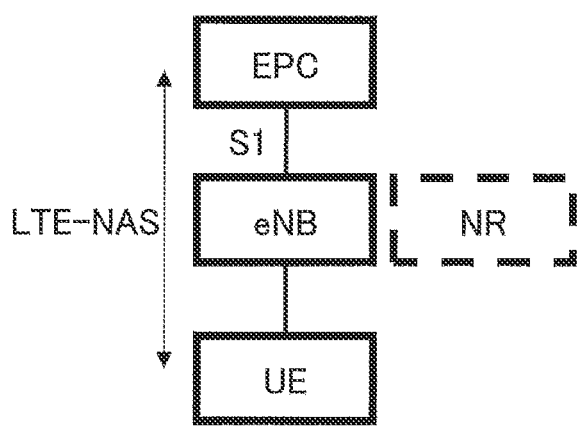
FIG. 3B is a diagram illustrating an example (1) of a C-plane connection mode according to an embodiment of the present invention.

FIG. 3A and FIG. 3B are diagrams illustrating examples (1) of a C-plane connection mode according to an embodiment of the present invention. FIG. 3A and FIG. 3B illustrate C-plane connection modes established between UE and EPC.

As illustrated in FIG. 3A, as a C-plane connection mode, the UE and the EPC are logically connected in LTE-NAS. The UE is connected to the eNB via a radio interface. The eNB is connected to the EPC via the S1 interface. U-plane is connected to the UE via the eNB.

As illustrated in FIG. 3B, as a C-plane connection mode, UE and EPC are logically connected in LTE-NAS. The UE is connected to eNB via a radio interface. The eNB is connected to the EPC via the S1 interface. The U-plan is connected to the UE via the eNB and an NR network node, e.g., gNB. In other words, C-planes for U-plan control can be shared by eNB. The operation illustrated in FIG. 3B is called NR non-stand-alone (Non stand-alone, NSA), in which communication is executed to which LTE-NR dual connectivity (E-UTRA-NR Dual connectivity, EN-DC) is applied.

FIG. 4A, FIG. 4B, FIG. 4C, and FIG. 4D are diagrams illustrating examples (2) of a C-plane connection mode according to an embodiment of the present invention. FIG. 4A, FIG. 4B, FIG. 4C and FIG. 4D illustrate C-plane connection modes established between UE and 5GC.

Figure 4A:
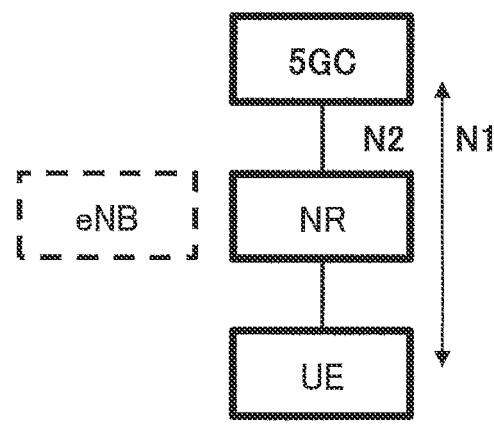
FIG. 4A is a diagram illustrating an example (2) of a C-plane connection mode according to an embodiment of the present invention.

As illustrated in FIG. 4A, as a C-plane connection mode, UE and 5GC are logically connected via a reference point N1. The reference point N1 is a reference point between the UE and AMF (Access and Mobility Management Function), which is one of network functions of the 5GC. The UE is connected to an NR network node, e.g., a gNB, via a radio interface. The NR network node is connected to the 5GC via a reference point N2. The reference point N2 is a reference point between the RAN and the AMF, which is one of the NFs of the 5GC. The U-plan is connected to the UE via an eNB and the NR network node.

Figure 4B:
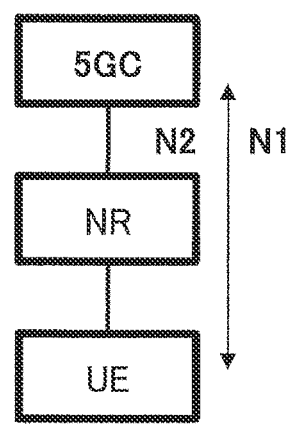
FIG. 4B is a diagram illustrating an example (2) of a C-plane connection mode according to an embodiment of the present invention.

As illustrated in FIG. 4B, as a C-plane connection mode, UE and 5GC are logically connected via a reference point N1. The UE is connected to an NR network node, e.g., a gNB, via a radio interface. The NR network node is connected to 5GC via a reference point N2. U-plan is connected to the UE via the NR network node.

Figure 4C:
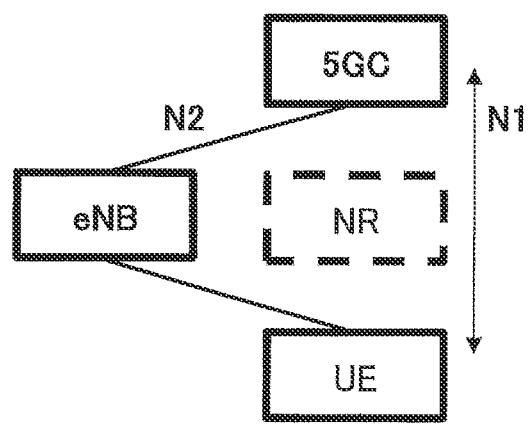
FIG. 4C is a diagram illustrating an example (2) of a C-plane connection mode according to an embodiment of the present invention.

As illustrated in FIG. 4C, as a C-plane connection mode, UE and 5GC are logically connected via a reference point N1. The UE is connected to an eNB via a radio interface. The eNB is connected to the 5GC via a reference point N2. The U-plane is connected to the UE via the eNB and an NR network node. The operation illustrated in FIG. 4C is referred to as NR non-stand-alone (NSA), in which communication is executed to which LTE-NR dual connectivity (EN-DC) is applied.

Figure 4D:
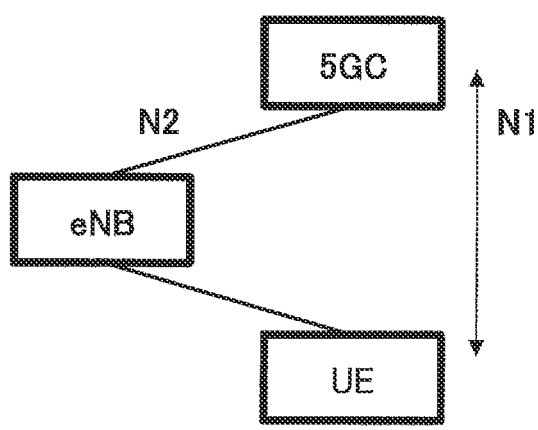
FIG. 4D is a diagram illustrating an example (2) of a C-plane connection mode according to an embodiment of the present invention.

As illustrated in FIG. 4D, as a C-plane connection mode, UE and 5GC are logically connected via a reference point N1. The UE is connected to an eNB via a radio interface. The eNB is connected to the 5GC via a reference point N2. U-plane is connected to the UE via the eNB.

As described above, as a mode for connection from the user equipment 200 to the 5GC, there are several modes. The user equipment 200 camps on an LTE cell by an eNB or an NR cell by a gNB based on a radio environment or a configuration, etc., and transmits a connection request to the network.

The connection mode in FIG. 3B or FIG. 4C is a mode in which the C-planes for controlling the two U-planes are commonly connected to the eNB, and an operation is allowed in which radio resources are shared.

The network may select as to whether the user equipment 200 is connected to the 5GC or the EPC according to a predetermined determination process based on UE capability, etc.

In a cell for shared operation between the 5GC and the EPC, two location registration areas are configured, which are a location registration area for the 5GC and a location registration area for the EPC. A tracking area code (Tracking Area Code, TAC) of the location registration area for the 5GC is formed of three octets, and a tracking area code of the location registration area for the EPC is formed of two octets. That is, a bit length of a tracking area code may vary depending on a core network.

Figure 5A:
FIG. 5A is a diagram illustrating an example of an inter-network node message according to an embodiment of the present invention.
Figure 5B:
FIG. 5B is a diagram illustrating an example of an inter-network node message according to an embodiment of the present invention.

FIG. 5A and FIG. 5B are diagrams illustrating examples of inter-network node messages according to embodiments of the present invention. FIG. 5A and FIG. 5B are examples of messages used when information representing a tracking area code is transmitted from an eNB or a gNB to a core network.

As illustrated in FIG. 5A, in the LTE, a NAS message "INITIAL UE MESSAGE" is transmitted from an eNB to an MME (Mobility Management Entity), which is a network node included in the EPC. The "INITIAL UE MESSAGE" includes an Information Element TAI (Tracking Area Identity), and the Information Element TAI includes an Information Element PLMN Identity and an Information Element TAC, i.e., a tracking area code. The TAC is formed of two octets. For example, the "INITIAL UE MESSAGE" is transmitted from the eNB to the MME upon location registration of the user equipment 200.

As illustrated in FIG. 5B, in NR, a NAS message "INITIAL UE MESSAGE" is transmitted from an NG-RAN node, e.g., a gNB, to an AMF, which is a network node included in 5GC. The "INITIAL UE MESSAGE" includes an Information Element TAI (Tracking Area Identity), and the Information Element TAI includes an Information Element PLMN Identity and an Information Element TAC, i.e., a tracking area code. The TAC is formed of three octets. For example, the "INITIAL UE MESSAGE" is transmitted from gNB to AMF upon location registration of the user equipment 200.

Note that a tracking area code may be transmitted from an eNB or a gNB to a core network, for example, with another message upon tracking area update (Tracking Area Update, TAU), etc., without limited to the message "INITIAL UE MESSAGE" illustrated in FIG. 5A and FIG. 5B.

FIG. 6 is a diagram illustrating an example of a configuration of a radio communication system according to an embodiment of the present invention. The radio communication system according to an embodiment of the present invention includes a base station apparatus 100A; a base station apparatus 100B; a base station apparatus 100C; (hereinafter referred to as a "base station apparatus 100" if they are not distinguished) and a user equipment 200, as illustrated in FIG. 6. In FIG. 6, three base station apparatuses 100 and one unit of user equipment 200 are illustrated. However, this is an example, and there may be more devices. In the following, the user equipment 200 is also referred to as "UE (User Equipment)."

The base station apparatus 100 is a communication device for providing one or more cells to execute radio communication with the user equipment 200. For example, as illustrated in FIG. 6, the base station apparatus 100A and the base station apparatus 100C are eNBs and provide LTE cells, and the base station apparatus 100B is a gNB and provides an NR cell. The base station apparatus 100B is a communication device that provides one or more NR cells to execute NR radio communication with the user equipment 200. When the base station apparatus 100B executes NR communication with the user equipment 200, the base station apparatus 100A and the base station apparatus 100B may communicate with the user equipment 200 in parallel using dual connectivity, or the base station apparatus 100O and the base station apparatus 100B may communicate with the user equipment 200 in parallel. The base station apparatus 100B and the user equipment 200 may perform beam forming to transmit and receive signals.

The user equipment 200 may be a communication device provided with a radio communication function, such as a smartphone, a cellular phone, a tablet, a wearable terminal, a communication device installed in a vehicle, a communication module for M2M (Machine-to-Machine), etc. The user equipment 200 wirelessly connects to the base station apparatus 100 and utilizes various communication services provided by the radio communication system including EPC or 5GC. The user equipment 200 is capable of applying beam forming to transmit and receive radio signals. In embodiments of the present invention, communication to which beam forming is applied is mainly assumed to be communication using a millimeter-wave band.

Here, the user equipment 200 communicates with the base station apparatus 100A and the base station apparatus 100B using LTE-NR dual connectivity and connects to the 5GC. That is, the user equipment 200 executes location registration with a tracking area code of 3 octets and belongs to the 5GC. The user equipment 200 can be connected to both EPC and 5GC. The base station apparatus 100A is assumed to be an eNB supporting the EPC and the 5GC, and the base station apparatus 100C is assumed to be an eNB supporting the EPC while not supporting the 5GC. The 5GC is a core network capable of accommodating multiple RATs, i.e., LTE and NR.

When the user equipment 200 attempts to execute handover to the base station apparatus 100C due to a change in a receiving environment of an LTE cell, etc., since no tracking area code of 3 octets for the 5GC is configured for the base station apparatus 100C, the user equipment 200 is required to stop belonging to the 5GC, and to belong to the EPC through the base station apparatus 1000 or to execute cell search for another cell.

Figure 7:
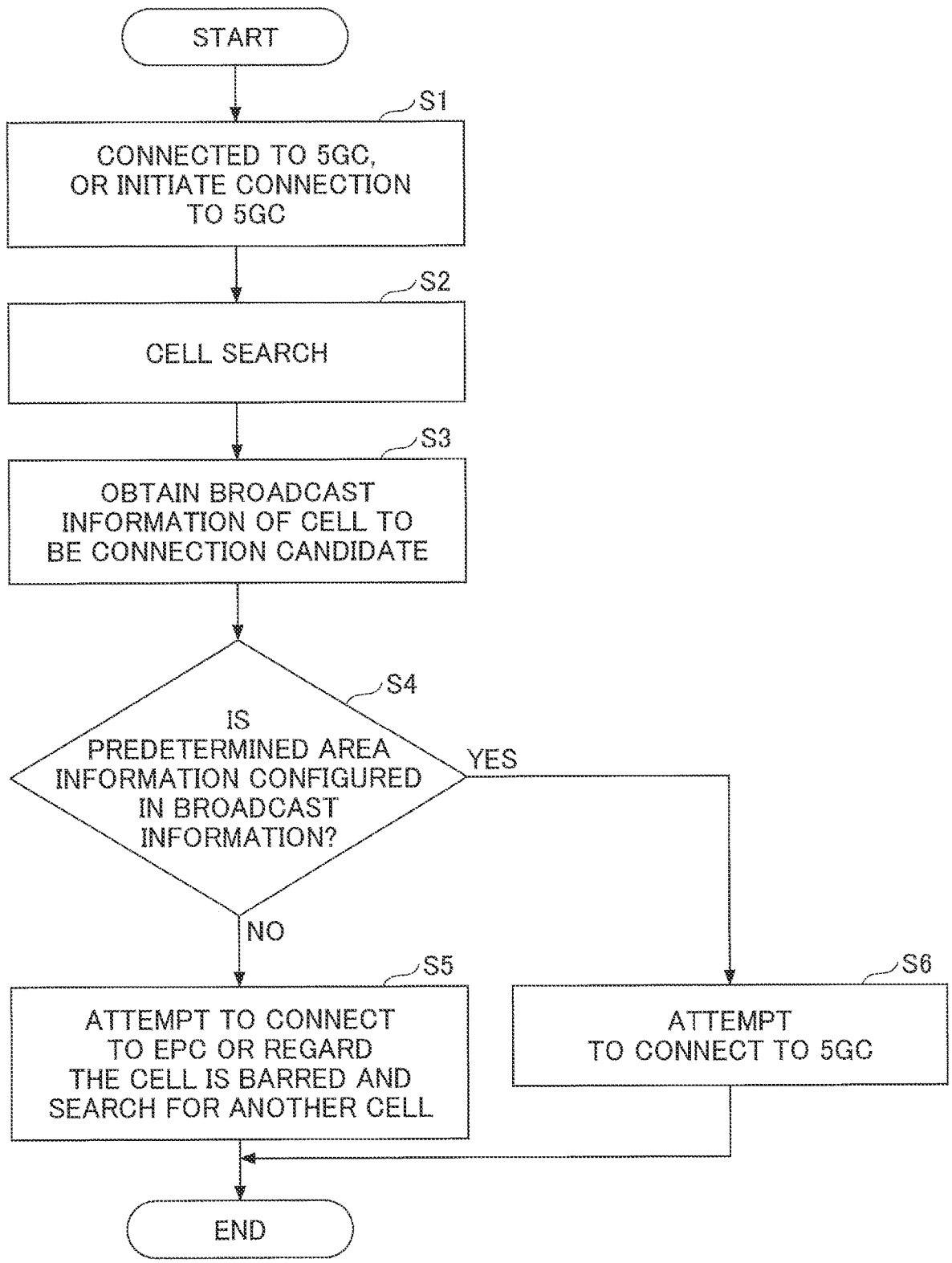
FIG. 7 is a flowchart illustrating a procedure for connecting to a core network according to an embodiment of the present invention.

FIG. 7 is a flowchart illustrating a connection procedure to a core network according to an embodiment of the present invention. In FIG. 7, a procedure is described that is for the user equipment 200 to connect to the core network.

In step S1, the user equipment 200 is connected to a 5GC, belongs to the 5GC, or is in a state in which connection to the 5GC is initiated. That is, location registration of the user equipment 200 has already been completed with a tracking area code for the 5GC, or location registration of the user equipment 200 is attempted with a tracking area code for the 5GC.

In subsequent step S2, the user equipment 200 executes cell search, cell selection, and belongs to a cell to obtain broadcast information of a cell to be a connection candidate (S3). A target of the cell search may be an LTE cell or an NR cell.

In step S4, the user equipment 200 determines whether predetermined area information is configured in the broadcast information of the cell as the connection candidate obtained in step S3. The predetermined area information is information representing a tracking area code for the 5GC. If no predetermined area information is configured in the broadcast information of the cell as the connection candidate (NO at S4), the process proceeds to step S5. If predetermined area information is configured in the broadcast information of the cell as the connection candidate (YES at S4), the process proceeds to step S6.

In step S5, the user equipment 200 attempts to connect to an EPC in the cell in which the broadcast information is obtained, or regards the cell in which the broadcast information is obtained as barred and searches for another cell. For example, the user equipment 200 may attempt to connect to an EPC by signaling, to the base station apparatus 100, information indicating that the user equipment 200 can only connect to the EPC, even if the user equipment 200 can connect to the 5GC, in the UE capability report of the user equipment 200. For example, the base station apparatus 100 may indicate or signal the user equipment 200 to connect to the EPC, even if UE capability indicating the capability of connecting to the 5GC is reported from the user equipment 200 or even if connection to the 5GC is requested by the user equipment 200.

In step S5, the core network apparatus included in the 5GC or the EPC may include a processing unit that instructs or signals the user equipment 200 to connect to the EPC, even if the UE capability indicating the capability to connect to the 5GC is reported from the user equipment 200, or even if connection to the 5GC is requested by the user equipment 200.

In step S6, the user equipment 200 attempts to connect to the 5GC in the cell in which the broadcast information is obtained. Since the broadcast information includes information representing a tracking area code for the 5GC, the user equipment 200 can complete location registration with the tracking area code for the 5GC.

As the procedure described above, upon detecting a cell that does not support a first core network while attempting to connect to the first core network, the user equipment 200 may connect to a second core network. Furthermore, upon detecting a cell that does not support a first core network while attempting to connect to the first core network, the user equipment 200 may connect to the first core network of a cell other than the above-described cell. Note that the above-described "location registration" may be "Attach Procedure."

By the above-described embodiments, upon attempting to connect to the 5GC, the user equipment 200 is able to detect a cell that does not support the 5GC, and the user equipment 200 is able to quickly complete location registration by changing a connection destination of the core network to the EPC. Furthermore, upon detecting a cell that does not support the 5GC while attempting to connect to the 5GC, the user equipment 200 stops connecting to the cell, and the user equipment 200 is able to quickly complete location registration to the 5GC by continuing connection operation to the 5GC by searching for another cell.

Namely, the user equipment is able to appropriately complete location registration to connect to the core network.

(Device Configuration)

Next, a functional configuration example of the base station apparatus 100 and the user equipment 200 that execute the process and operation described above is described. The base station apparatus 100 and the user equipment 200 include the functions for implementing the above-described embodiments. However, each of the base station apparatus 100 and the user equipment 200 may include only some of the functions in the embodiments.

<Base Station Apparatus 100>

Figure 8:
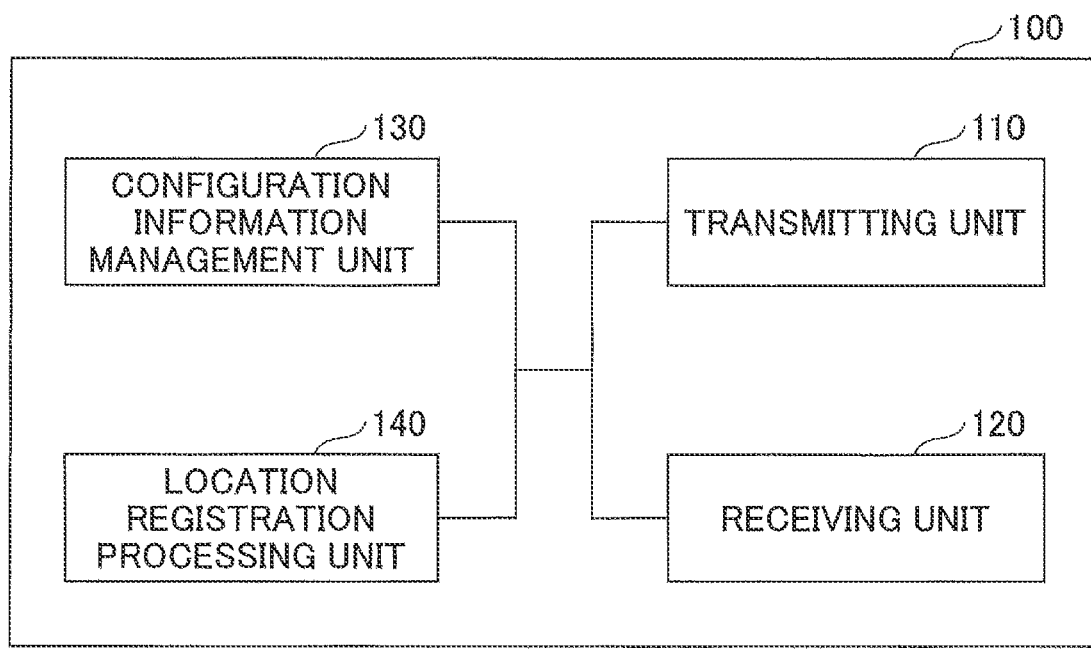
FIG. 8 is a diagram illustrating an example of a functional configuration of a base station apparatus 100 according to an embodiment of the present invention

FIG. 8 is a diagram illustrating an example of a functional configuration of the base station apparatus 100. As illustrated in FIG. 8, the base station apparatus 100 includes a transmitting unit 110, a receiving unit 120, a configuration information management unit 130, and a location registration processing unit 140. The functional configuration illustrated in FIG. 8 is only one example. Functional division and names of the functional units may be any division and names, provided that the operation according to an embodiment of the present invention can be performed.

The transmitting unit 110 includes a function for generating a signal to be transmitted to the user equipment 200 and transmitting the signal through radio. The receiving unit 120 includes a function for receiving various signals transmitted from the user equipment 200 and retrieving, for example, higher layer information from the received signals. The transmitting unit 110 is provided with a function for transmitting NR-PSS, NR-SSS, NR-PBCH, DL/UL control signals, etc., to the user equipment 200. The transmitting unit 110 transmits information related to the transmit power control, information related to scheduling, and information related to a measurement configuration to the user equipment 200, and the receiving unit 120 receives a message related to a report of the measurement result from the user equipment 200.

The configuration information management unit 130 stores preconfigured configuration information and various types of configuration information transmitted to the user equipment 200. The content of the configuration information is, for example, information used for location registration and TAU of the user equipment 200.

The location registration processing unit 140 executes control related to generation of information used for location registration and TAU, etc., executed by the user equipment 200, and control of processing of the message related to the location registration and the TAU received from the user equipment 200, which are described in the embodiments.

<User Equipment 200>

Figure 9:
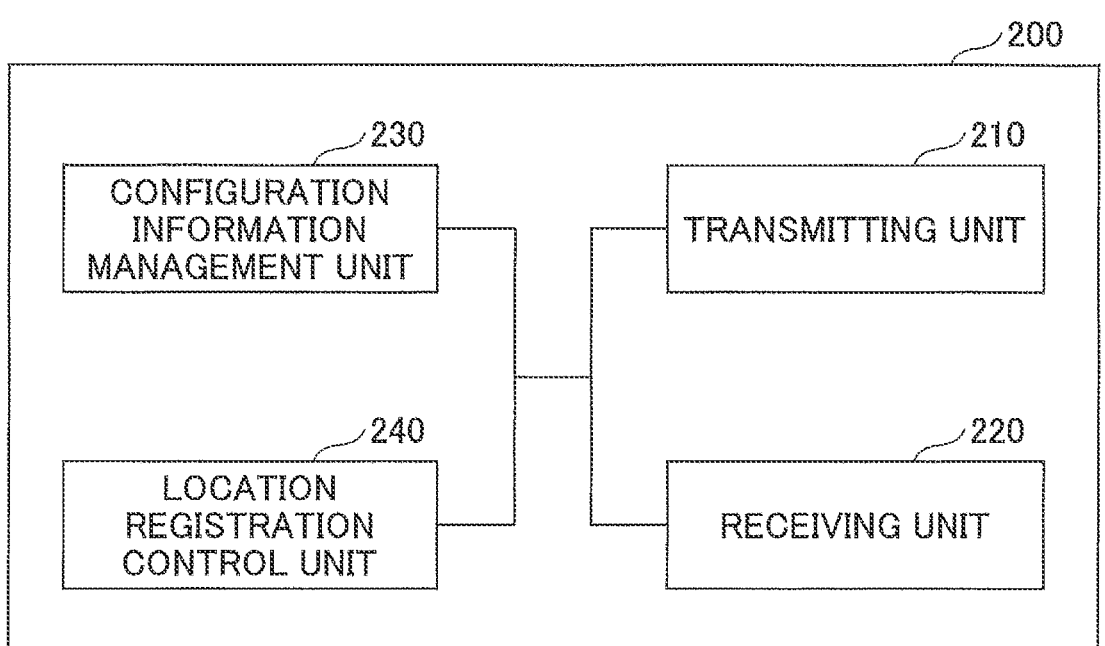
FIG. 9 is a diagram illustrating an example of a functional configuration of user equipment 200 according to an embodiment of the present invention.

FIG. 9 is a diagram illustrating an example of a functional configuration of the user equipment 200. As illustrated in FIG. 9, the user equipment 200 includes a transmitting unit 210, a receiving unit 220, a configuration information management unit 230, and a location registration control unit 240. The functional configuration illustrated in FIG. 9 is 16 r only one example. Functional division and names of the functional units may be any division and names, provided that the operation according to the embodiments of the present invention can be performed.

The transmitting unit 210 generates a transmit signal from transmit data and transmits the transmit signal through radio. The receiving unit 220 receives various types of signals wirelessly and retrieves a higher layer signal from the received physical layer signal. The receiving unit 220 is provided with a function to receive NR-PSS, NR-SSS, NR-PBCH, DL/UL control signals, etc., transmitted from the base station apparatus 100. The transmitting unit 210 transmits a message related to a report of a measurement result to the base station apparatus 100, and the receiving unit 120 receives information used for a measurement configuration from the base station apparatus 100.

The configuration information management unit 230 stores various types of configuration information received from the base station apparatus 100 by the receiving unit 220. The configuration information management unit 230 also stores preconfigured configuration information. The content of the configuration information is, for example, information related to a configuration for executing the location registration and the TAU.

The location registration control unit 240 performs control related to execution of location registration and TAU, etc., in the user equipment 200, which is described in the embodiments. The transmitting unit 210 may include a functional unit for transmission of messages related to the location registration and the TAU of the location registration control unit 240, and the receiving unit 220 may include a functional unit for reception of messages related to the location registration and the TAU of the location registration control unit 240.

(Hardware Configuration)

The functional configuration diagrams (FIG. 8 and FIG. 9) used for describing the above-described embodiments of the present invention show blocks of functional units. These functional blocks (components) are implemented by any combination of hardware and/or software. Additionally, means for implementing each functional block is not particularly limited. Namely, each functional block may be implemented by a single device in which a plurality of elements is physically and/or logically coupled, or each functional block may be implemented by a plurality of devices, while directly and/or indirectly (e.g., wired and/or wireless) connecting two or more devices that are physically and/or logically separated.

Figure 10:
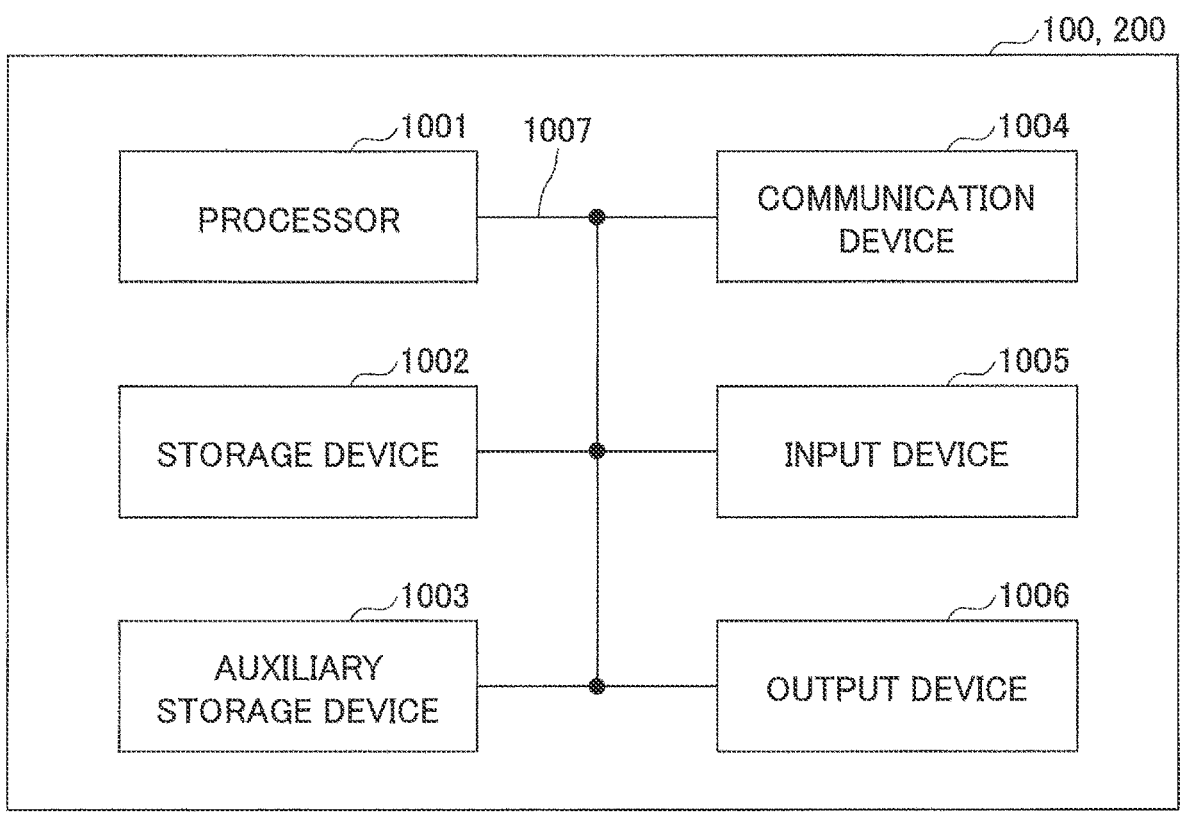
FIG. 10 is a diagram illustrating an example of a hardware configuration of the base station apparatus 100 or the user equipment 200 according to an embodiment of the present invention.

For example, each of the base station apparatus 100 and the user equipment 200 in the embodiments of the present invention may function as a computer that performs processing according to the embodiments of the present invention. FIG. 10 is a diagram illustrating an example of a hardware configuration of a radio communication device, which may be the base station apparatus 100 or the user equipment 200 according to the embodiments of the present invention. Each of the above-described base station apparatus 100 and the user equipment 200 may be physically configured as a computer device including a processor 1001; a storage device 1002; an auxiliary storage device 1003; a communication device 1004; an input device 1005; an output device 1006; a bus 1007, etc.

Note that, in the following description, the term "apparatus" can be read as a circuit, a device, a unit, etc. The hardware configuration of each of the base station apparatus 100 and the user equipment 200 may be configured to include one or more of the respective devices indicated by 1001 through 1006 in the figure, or may be configured not to include a part of the devices.

Each function of the base station apparatus 100 and the user equipment 200 is implemented by loading predetermined software (program) on hardware, such as the processor 1001 and the storage device 1002, so that the processor 1001 performs computation and controls communication by the communication device 1004, and reading and/or writing of data in the storage device 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, etc.

Additionally, the processor 1001 reads a program (program code), a software module and data from the auxiliary storage device 1003 and/or the communication device 1004 to the storage device 1002, and executes various processes according to these. As the program, a program is used which causes a computer to execute at least a part of the operations described in the above-described embodiments. For example, the transmitting unit 110, the receiving unit 120, the configuration information management unit 130, and the location information registration processing unit 140 of the base station apparatus 100 illustrated in FIG. 8 may be implemented by a control program stored in the storage device 1002 and executed by the processor 1001. Furthermore, for example, the transmitting unit 210, the receiving unit 220, the configuration information management unit 230, and the location registration control unit 240 of the user equipment 200 illustrated in FIG. 9 may be implemented by a control program stored in the storage device 1002 and executed by the processor 1001. Although it is described that the above-described various processes are executed by a single processor 1001, the above-described various processes may be simultaneously or sequentially executed by two or more processors 1001. The processor 1001 may be implemented by one or more chips. Note that the program may be transmitted from a network via an electric communication line.

The storage device 1002 is a computer readable recording medium, and the storage device 1002 may be formed of at least one of a ROM (Read-Only Memory), an EPROM (Erasable Programmable ROM), an EEPROM (Electrically Erasable Programmable ROM), a RAM (random access memory), etc. The storage device 1002 may be referred to as a register, a cache, a main memory (main storage device), etc. The storage device 1002 can store programs (program codes), software modules, etc., that can be executed to perform the process according to the embodiments of the present invention.

The auxiliary storage device 1003 is a computer readable recording medium, and, for example, the auxiliary storage device 1003 may be formed of at least one of an optical disk such as a CD-ROM (Compact Disc ROM), a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, etc. The auxiliary storage device 1003 may be referred to as an auxiliary storage device. The above-described storage medium may be, for example, a database including the storage device 1002 and/or the auxiliary storage device 1003, a server, or any other suitable medium.

The communication device 1004 is hardware (transmission/reception device) for performing communication between computers via a wired and/or wireless network, and, for example, the communication device 1004 is also referred to as a network device, a network controller, a network card, a communication module, etc. For example, the transmitting unit 110 and the receiving unit 120 of the base station apparatus 100 may be implemented by the communication device 1004. Additionally, the transmitting unit 210 and the receiving unit 220 of the user equipment 200 may be implemented by the communication device 1004.

The input device 1005 is an input device (e.g., a keyboard, a mouse, a microphone, a switch, a button, a sensor, etc.) for receiving an input from outside. The output device 1006 is an output device (e.g., display, speaker, LED lamp, etc.) that performs output toward outside. Note that the input device 1005 and the output device 1006 may be integrated (for example, a touch panel).

Furthermore, the devices, such as the processor 1001 and the storage device 1002, are connected by a bus 1007 for communicating information. The bus 1007 may be formed of a single bus, or the bus 1007 may be formed of buses that are different among the devices.

Furthermore, each of the base station apparatus 100 and the user equipment 200 may be configured to include hardware, such as a microprocessor, a digital signal processor (DSP: Digital Signal Processor), an ASIC (Application Specific Integrated Circuit), a PLD (Programmable Logic Device), an FPGA (Field Programmable Gate Array), etc., and a part or all of the functional blocks may be implemented by the hardware. For example, the processor 1001 may be implemented by at least one of these hardware components.

(Conclusion of the embodiments) As described above, according to the embodiments of the present invention, there is provided user equipment capable of connecting to a first core network and a second core network through a base station apparatus, wherein the user equipment includes a controller that connects to, upon selecting or visiting a cell of a base station apparatus that does not support the first core network while connecting to the first core network or visiting the first core network, the second core network through a connection in the cell.

With the above-described configuration, upon attempting to connect to 5GC, the user equipment 200 can find a cell that does not support 5GC, so that location registration can be quickly completed by changing a connection destination of the core network to EPC. Namely, the user equipment is able to appropriately complete location registration to connect to the core network.

Upon selecting or visiting the cell of the base station that does not support the first core network while connecting to the first core network or visiting the first core network, the controller may bar the cell from selection targets, and the controller may search for another cell. With this configuration, upon detecting a cell that does not support 5GC while attempting to connect to 5GC, the user equipment 200 stops connecting to the cell and searches for another cell to continue connection operation to 5GC, and thereby the user equipment 200 can appropriately complete location registration to 5GC.

A receiver may further be included, which is for receiving broadcast information of the cell. Upon detecting that predetermined area information is not configured in the broadcast information, the controller may determine that the base station apparatus does not support the first core network. With this configuration, upon attempting to connect to 5GC, the user equipment 200 can detect a cell that does not support 5GC based on the broadcast information.

The predetermined area information may be information indicating a tracking area code. With this configuration, upon attempting to connect to 5GC, the user equipment 200 can detect a cell that does not support 5GC based on the tracking area code.

A transmitter may be included, which is for transmitting UE capability of the user equipment to the base station apparatus. The user equipment may connect to the second core network through the connection in the cell by transmitting, to the base station apparatus, UE capability including information indicating capability of connecting only to the second core network. With this configuration, upon attempting to connect to 5GC, the user equipment 200 can connect to EPC by transmitting UE capability that does not support 5GC.

Furthermore, according to the embodiments of the present invention, there is provided a base station apparatus for communicating with user equipment capable of connecting to a first core network and a second core network, wherein the base station apparatus is incapable of connecting to the first core network and the base station apparatus is capable of connecting to the second core network, the base station apparatus including a processor that connects, upon detecting that the user equipment requests connection to the first core network, the user equipment to the second core network.

With the above-described configuration, the base station apparatus 100 can quickly complete location registration by changing a connection destination of the core network of the user equipment 200 from 5GC to EPC. Namely, the user equipment can appropriately complete location registration to connect to a core network.

Furthermore, according to the embodiments of the present invention, there is provided a core network apparatus including a processor that connects user equipment to a second core network, upon detecting that the user equipment requests connection to a first core network through a base station apparatus for communicating with the user equipment capable of connecting to the first core network and the second core network, wherein the base station apparatus is incapable of connecting to the first core network and the base station apparatus is capable of connecting to the second core network.

With the above-described configuration, the core network apparatus can quickly complete location registration by changing a connection destination of the core network of the user equipment 200 from 5GC to EPC. Namely, the user equipment can appropriately complete location registration to connect to a core network.

Supplemental Embodiments

The embodiments of the present invention are described above. However, the disclosed invention is not limited to the above-described embodiments, and those skilled in the art would appreciate various modified examples, revised examples, alternative examples, substitution examples, and so forth. In order to facilitate understanding of the invention, specific numerical value examples are used for description.

However, the numerical values are merely examples, and any suitable values may be used unless as otherwise specified. The classification of items in the above description is not essential to the present invention. Matter described in two or more items may be combined and used as necessary, and matter described in one item may be applied to matter described in another item (provided that they do not contradict). The boundary between functional units or processing units in a functional block diagram does not necessarily correspond to the boundary between physical components. Operations of a plurality of functional units may be performed physically by one component, or an operation of one functional unit may be physically performed by a plurality of parts. The order of the procedures described in the embodiments may be changed, provided that they do not contradict. For the sake of convenience of processing description, the base station apparatus 100 and the user equipment 200 are described using the functional block diagrams. However, such devices may be implemented by hardware, software, or a combination thereof. Each of software executed by the processor included in the base station apparatus 100 according to the embodiments of the present invention and software executed by the processor included in the user equipment 200 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Notification of information is not limited the aspects/ embodiments described in the present specification and may be performed by other methods. For example, notification of information may be performed via physical layer signaling (for example, (DCI) Downlink Control Information or UCI (Uplink Control Information), higher-layer signaling (for example, RRC (Radio Resource Control) signaling, MAC (Medium Access Control) signaling, broadcast information (MIB (Master Information Block), or SIB (System Information Block), other signals, or by a combination thereof. Moreover, an RRC message may be referred to as the RRC signaling. Furthermore, the RRC message may be an RRC connection setup (RRC Connection Setup) message, an RRC connection reconfiguration (RRC Connection Reconfiguration) message, or the like, for example.

Each aspect/embodiment described in this specification can be applied to LTE (Long Term Evolution), LTE-A (LTE-advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-Wideband), Bluetooth (registered trademark), any other systems using an appropriate system and/or next generation systems extended on the basis of these systems.

In processing procedures, sequences, flowcharts, etc., of each aspect/embodiment described in the specification, the order may be changed provided that there is no contradiction. For example, for the methods described in the specification, the elements of the various steps are presented in an exemplary order and are not limited to a specific order presented.

The specific operations that are described in the specification to be performed by the base station apparatus 100 may be performed by their upper nodes in some cases. In a network formed of one or more network nodes including the base station apparatus 100, it is apparent that the various operations performed for communication with the user equipment 200 may be performed by the base station apparatus 100 and/or a network node other than the base station apparatus 100 (e.g., MME or S-GW can be considered, however, not limited to these). In the above description, a case is exemplified in which there is one network node other than the base station apparatus 100. However, it can be a combination of other network nodes (e.g., MME and S-GW).

Each aspect/embodiment described in this specification may be used alone, may be used in combination, or may be used while being switched during the execution.

The user equipment 200 may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

The base station apparatus 100 may be referred to, by a person ordinarily skilled in the art, as a NB (NodeB), an eNB (evolved NodeB), gNB (next generation NodeB), a base station (Base Station), or any other suitable terms.

The terms "determine (determining)" and "decide (determining)" used in this specification may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "based on" used in the present specification does not mean "based on only" unless as otherwise specified explicitly. In other words, the expression "based on" means both "based on only" and "based on at least."

As long as "include," "including," and variations thereof are used in this specification or the claims, the terms are intended to be inclusive in a manner similar to the term "comprising." Furthermore, the term "or" used in the specification or claims is intended not to be an exclusive OR.

In the whole of the present disclosure, for example, if articles are added by translation, such as "a," "an," and "the," these articles may include a plural forms, unless as otherwise indicated explicitly by the context.

Note that, in the embodiments of the present invention, the location registration control unit 240 is an example of a control unit. The location registration processing unit 140 is an example of a processing unit. 5GC is an example of a first core network. EPC is an example of a second core network.

The present invention is described in detail above. It is apparent for a person ordinarily skilled in the art that the present invention is not limited to the embodiments described in the present specification. The present invention can be implemented as modified embodiments and altered embodiments without departing from the gist and scope of the present invention defined by the scope of the claims. Accordingly, the descriptions of the present specification are for the purpose of illustration and do not have any restrictive meaning to the present invention.

This international patent application is based on and claims priority to Japanese Patent Application No. 2018-101054 filed on May 25, 2018, and the entire content of Japanese Patent Application No. 2018-101054 is incorporated herein by reference.

LIST OF REFERENCE SYMBOLS 100 base station apparatus
110 transmitting unit
120 receiving unit
130 configuration information management unit
140 location registration processing unit
200 user equipment
210 transmitting unit
220 receiving unit
230 configuration information management unit
240 location registration control unit
1001 processor
1002 storage device
1003 auxiliary storage device
1004 communication device
1005 input device
1006 output device

The invention claimed is:

1. A terminal capable of connecting to a 5G core network (5GC) and an evolved packet core (EPC) through a base station apparatus, wherein the terminal comprises:
   a receiver that receives broadcast information from the base station apparatus;
   a transmitter that transmits a connection request to the base station apparatus; and
   a controller that controls a connection with the base station apparatus,
   wherein the transmitter transmits information indicating that the terminal is capable of connecting to the 5GC in a capability report, and
   wherein, when the base station apparatus is connected to the 5GC, and a tracking area code for the 5GC is not configured in the broadcast information, the transmitter transmits, to the base station apparatus, information indicating that the terminal is capable of connecting only to the EPC.

2. A base station apparatus capable of connecting to a 5G core network (5GC) and an evolved packet core (EPC), the base station apparatus comprising:
   a transmitter that transmits broadcast information;
   a receiver that receives a connection request from a terminal; and
   a processor that control a connection with the terminal,
   wherein the receiver receives information indicating that the terminal is capable of connecting to the 5GC in a capability report, and
   wherein, when the base station apparatus is connected to the 5GC, and a tracking area code for the 5GC is not configured in the broadcast information, the receiver receives, from the terminal, information indicating that the terminal is capable of connecting only to the EPC.

3. A radio communication system comprising:
   a core network apparatus including a 5G core network (5GC) and an evolved packet core (EPC);
   a base station apparatus capable of connecting to the core network apparatus; and
   a terminal capable of connecting to the 5GC and the EPC through the base station apparatus,
   wherein the core network apparatus includes a processor of the core network apparatus that controls a connection with the terminal through the base station apparatus,
   wherein the base station apparatus includes:
      a transmitter of the base station that transmits broadcast information;
      a receiver of the base station that receives a connection request from the terminal; and
      a processor of the base station that controls a connection with the terminal,
   wherein the terminal includes:
      a receiver of the terminal that receives the broadcast information from the base station apparatus;
      a transmitter of the terminal that transmits the connection request to the base station apparatus; and
      a controller that controls the connection with the base station apparatus,
   wherein the transmitter of the terminal transmits information indicating that the terminal is capable of connecting to the 5GC in a capability report, and
   wherein, when the base station apparatus is connected to the 5GC, and a tracking area code for the 5GC is not configured in the broadcast information, the transmitter of the terminal transmits, to the base station apparatus, information indicating that the terminal is capable of connecting only to the EPC.

* * * * *